United States Patent [19]

Kawamura

[11] Patent Number: 5,500,578
[45] Date of Patent: Mar. 19, 1996

[54] CONTROLLER FOR A VIBRATION WAVE MOTOR

[76] Inventor: Masaharu Kawamura, c/o Canon Kabushiki Kaisha, Tamagawa-Jigyosho 770, Shimonoge, Takatsu-ku, Kawasaki-shi, Kanagawa-ken, Japan

[21] Appl. No.: 479,821

[22] Filed: Jun. 7, 1995

Related U.S. Application Data

[63] Continuation of Ser. No. 341,447, Nov. 16, 1994, abandoned, which is a continuation of Ser. No. 959,488, Oct. 9, 1992, abandoned, which is a continuation of Ser. No. 780,703, Sep. 25, 1985, abandoned, which is a continuation of Ser. No. 716,509, Mar. 25, 1985, abandoned, which is a continuation of Ser. No. 579,586, Feb. 13, 1984, abandoned.

[30] Foreign Application Priority Data

| Feb. 23, 1983 | [JP] | Japan | 58-28877 |
| Feb. 23, 1983 | [JP] | Japan | 58-28878 |
| Mar. 25, 1983 | [JP] | Japan | 58-51344 |
| Mar. 25, 1983 | [JP] | Japan | 58-51345 |
| Mar. 25, 1983 | [JP] | Japan | 58-51346 |
| Mar. 25, 1983 | [JP] | Japan | 58-51347 |

[51] Int. Cl.$^6$ .................................. H01L 41/08
[52] U.S. Cl. ............................ 318/116; 316/316
[58] Field of Search ................ 310/323, 328, 310/316, 317; 318/116

[56] References Cited

U.S. PATENT DOCUMENTS

| 3,673,474 | 6/1972 | White et al. | 318/116 |
| 3,967,143 | 6/1976 | Watanabe et al. | 318/116 X |
| 4,019,073 | 4/1977 | Vishnevsky | 310/322 |
| 4,240,141 | 12/1980 | Vasiliev et al. | 310/316 X |
| 4,249,100 | 2/1981 | Vasiliev et al. | 310/316 X |
| 4,275,362 | 6/1991 | Mishiro et al. | 310/316 |
| 4,484,099 | 11/1984 | Kawar et al. | 310/328 |
| 4,560,263 | 12/1985 | Katsuma et al. | 310/317 X |
| 4,562,374 | 12/1985 | Sashida | 310/317 |
| 4,804,760 | 3/1985 | Yamamoto et al. | 310/323 |

FOREIGN PATENT DOCUMENTS 3345274  6/1984  Germany.

*Primary Examiner*—Mark O. Budd
*Attorney, Agent, or Firm*—Morgan & Finnegan

[57] ABSTRACT

In a vibration motor for driving a movable member contacted to a vibration member by a travelling vibration wave generated by the vibration member by applying a periodic voltage to an electrostrictive element contacted to the vibration member, a frequency of the periodic voltage is sequentially changed, a drive speed of the movable member is measured at each frequency, the measurements are sequentially compared, a frequency which results in the largest measurement is stored, and the movable member is driven by the periodic voltage of the stored frequency.

24 Claims, 12 Drawing Sheets

CONTROLLER FOR A VIBRATION WAVE MOTOR

This is a continuation of application Ser. No. 08/341,447, filed on Nov. 16, 1994, now abandoned, which is a continuation of application Ser. No. 07/959,488, filed on Oct. 9, 1992, now abandoned, which is a continuation of application Ser. No. 06/780,703, filed on Sep. 25, 1985, now abandoned, which is a continuation of application Ser. No. 716,509, filed Mar. 25, 1985, now abandoned, which in turn is a continuation of original patent application Ser. No. 579,586, filed Feb. 13, 1984, now abandoned.

BACKGROUND OF THE INVENTION

1. Field of the Invention

The present invention relates to a controller for a vibration wave motor having an improved drive efficiency.

2. Description of the Prior Art

As shown in U.S. Pat. No. 4,019,073, a vibration wave motor transduces a vibration movement generated by applying a periodic voltage such as an AC voltage or a pulsating voltage to an electrostrictive element to a rotational movement or a one-dimensional movement. Since it does not need a winding unlike a conventional electromagnetic motor, it is simple in structure and compact, produces a high torque at a low rotating speed and has a low inertia in rotation.

However, the prior art vibration wave motor transduces a vibration movement of a standing wave generated in the vibration member to a unidirectional movement of the movable member by frictionally driving the movable member such as a rotor which contacts to the vibration member.

In order to reverse the direction of the movement, it is necessary to switch a mechanical construction such as switching of a contact position or a contact angle between the vibration member and the movable member. Accordingly, a large scale device is needed to reversibly drive the vibration wave motor, which sacrifices the advantage of the vibration wave motor, that is, the simple construction and the compactness.

As an approach to resolve the above problem, a vibration wave motor which is driven by a travelling vibration wave has recently been proposed.

FIG. 1 illustrates components of such a vibration wave motor.

Fitted in a central cylinder $5a$ of a stator 5 which serves as a base are vibration absorber 4, a metal ring vibration member 2 having an electrostrictive device 3 bonded on a surface facing the absorber 4, and a movable member 1, in this order. The stator 5, the absorber 4 and the vibration member 2 are mounted to prevent relative rotation. The movable member 1 is press-contacted to the vibration member 2 by its weight or biasing means, not shown, to maintain an integrity of the motor. The electrostrictive device 3 includes a group of electrostrictive elements $3A_1$–$3A_7$ arranged at a pitch equal to one half of a wavelength $\lambda$ of a vibration wave. The electrostrictive elements $3A_1, 3A_3, 3A_5$ and $3A_7$ are polarized in one direction and the interposing electrostrictive elements $3A_2, 3A_4$ and $3A_6$ are polarized in the opposite direction. Thus, the electrostrictive elements $3A_1$–$3A_7$ are polarized oppositely between the adjacent ones. The electrostrictive device 3 includes another group of electrostrictive elements $3B_1$–$3B_7$ which are also arranged at the pitch of $\lambda/2$ and polarized oppositely between adjacent ones.

The group of electrostrictive elements $3A_1$–$3A_7$ and the group of electrostrictive elements $3B_1$–$3B_7$ are phase-differentially arranged at a mutual pitch of $(\eta_0+\frac{1}{4})\lambda$, where $\eta_0=0, 1, 2, 3, \ldots$.

The electrostrictive device 3 need not be the plurality of electrostrictive elements but it may be a single ring element 3 which is polarized at the pitch of $\lambda/2$ to form polarized areas $3a_1$–$3a_5$ and $3b_1$–$3b_5$, as shown in FIG. 2.

A lead wire $11a$ is connected to the electrostrictive elements $3A_1$–$3A_7$. On the sides facing the absorber 4, and a lead wire $11b$ is connected to the electrostrictive elements $3B_1$–$3B_7$, and those wires are connected to a power supply $6a$ and a 90° phase shifter $6b$ (see FIG. 3). The lead wire $11c$ is connected to the metal vibration member 2 and to the AC power supply $6a$.

The vibration wave motor thus constructed operates in the following manner.

FIG. 3 illustrates the generation of the vibration wave in the motor. While the electrostrictive elements $3A_1$–$3A_4$ and $3B_1$–$3B_4$ are shown in adjacent to each other for the purpose of explanation, they meet the requirement of $\lambda/4$ phase shift and they are essentially equivalent to the arrangement of the electrostrictive elements $3A_1$–$3A_4$ and $3B_1$–$3B_4$ of the motor shown in FIG. 1. Symbols ⊕ in the electrostrictive elements $3A_1$–$3A_4$ and $3B_1$–$3B_4$ indicate that the electrostrictive elements expand in a positive cycle of the AC voltage and symbols ⊖ indicate that they shrink in the positive cycle.

The metal vibration member 2 is used as one electrode for the electrostrictive elements $3A_1$–$3A_4$ and $3B_1$–$3B_4$, the AC voltage of $V=V_o \sin \omega t$ is applied to the electrostrictive elements $3A_1$–$3A_4$ from the AC power supply $6a$ and the $\lambda/4$-phase shifted AC voltage of $V=V_o \sin(\omega t \pm \pi/2)$ is applied to the electrostrictive elements $3B_1$–$3B_4$ from the AC power supply $6a$ through the 90° phase shifter $6b$, where signs + and − in the equation are selected by the phase shifter 1 depending on the direction of movement of the movable member 1 (not shown in FIG. 3). When the sign + is selected, the phase is shifted by +90° and the movable member 1 is moved forward, and when the symbol − is selected, the phase is shifted by −90° and the movable member 1 is moved reversely. It is now assumed that the sign − is selected and the voltage of $V=V_o \sin(\omega t-\pi/2)$ is applied to the electrostrictive elements $3B_1$–$3B_4$. When only the electrostrictive elements $3A_1$–$3A_4$ are vibrated by the application of the voltage of $V=V_o \sin \omega t$, a vibration by a standing wave as shown in FIG. 3(a) is generated. When only the electrostrictive elements $3B_1$–$3B_4$ are vibrated by the application of the voltage of $V=V_o \sin(\omega t-\pi/2)$, a vibration by a standing wave as shown in FIG. 3(b) is generated. When the two AC voltages having a phase difference therebetween are simultaneously applied to the electrostrictive elements $3A_1$–$3A_4$ and $3B_1$–$3B_4$, a vibration wave is a travelling wave. FIG. 3(c) shows a waveform at a time $t=2n\pi/\omega$, FIG. 3(d) shows a waveform at a time $t=\pi/2\omega+2n\pi/\omega$, FIG. 3(e) shows a waveform at $t=\pi/\omega+2n\pi/\omega$ and FIG. 3(f) shows a waveform at $t=3\pi/2\omega+2n\pi/\omega$. A wavefront of the vibration wave travels in the direction of an x-axis.

The travelling wave includes a longitudinal wave and a lateral wave. Looking at a mass point of the vibrating member 2 as shown in FIG. 4, a longitudinal amplitude u and a lateral amplitude w cause a clockwise rotating elliptic movement. The movable member 1 is press-contacted to the surface of the vibrating member 2 and it contacts to only an apex of the vibration plane. Thus, the vibration member 1 is driven by the component of the longitudinal amplitude u of the elliptic movement of the mass points A, A', . . . at the apex so that it is moved in a direction of an arrow N.

The velocity of the mass point A at the apex is V=2πfu (when f is the vibration frequency) and the velocity of movement of the movable member 1 depends on the velocity of the mass point and also depends on the lateral amplitude w because of the frictional drive by the press-contact. Thus, the velocity of the movable member 1 is proportional to the magnitude of the elliptic movement of the mass point A.

On the other hand, since the movable member 1 is friction-driven at the apex of the wavefront of the travelling vibration wave of the vibration member 2, it is necessary that the wavefront in the direction of apex (z-axis direction in FIG. 4) resonates in order to improve a drive efficiency. There exists a relationship of $f=\sqrt{E/3\rho \cdot \pi h/\lambda^2}$, where f $(=2\pi\omega)$ is the frequency of the input voltage, E is a Young's modulus of the vibration member 2, ρ is a density, h is a thickness and λ is a wavelength of the wave generated. The resonance occurs at the thickness which meets the above relationship.

Since the vibration member 2 is of ring shape, the travelling vibration wave travels along the ring and the resonance occurs when the newly generated wave and the circumferential length πD is n times (where n is a natural number) as large as the wavelength λ, that is, nλ=πD.

The amplitude of the travelling vibration wave grows by the resonance so that the drive efficiency of the vibration wave motor is improved.

In order to improve the drive efficiency of such vibration wave motor, it is necessary to control the frequency of the applied periodic voltage while taking various conditions such as the thickness and the radius of the vibration member into consideration.

However, after the adjustment, the resonance frequency may shift or vary by a change of a temperature of the motor or an oscillation circuit, or a fatigue of the motor such as abrasion of the vibration member.

In addition, a manufacturing cost increases because of adjustment step of the frequency.

On the other hand, it is desirable that the frequency is controlled such that an optimum resonance frequency is attained at a highest rotating speed of the vibration wave motor.

It is an object of the present invention to provide a controller for a vibration wave motor which stores a frequency which results in a highest measured drive speed of the vibration wave motor and drives the motor by a periodic voltage of the stored frequency in order to improve a drive efficiency.

It is another object of the preset invention to provide a controller for a vibration wave motor which intermittently drives the motor by a periodic voltage of a stored frequency.

It is other object of the present invention to provide a controller for a vibration wave motor which stores a frequency which results in a maximum measured amplitude of a vibration member of the vibration wave motor and drives the motor by a periodic voltage of the stored frequency.

DETAILED DESCRIPTION OF THE PREFERRED EMBODIMENTS

Figure 1:
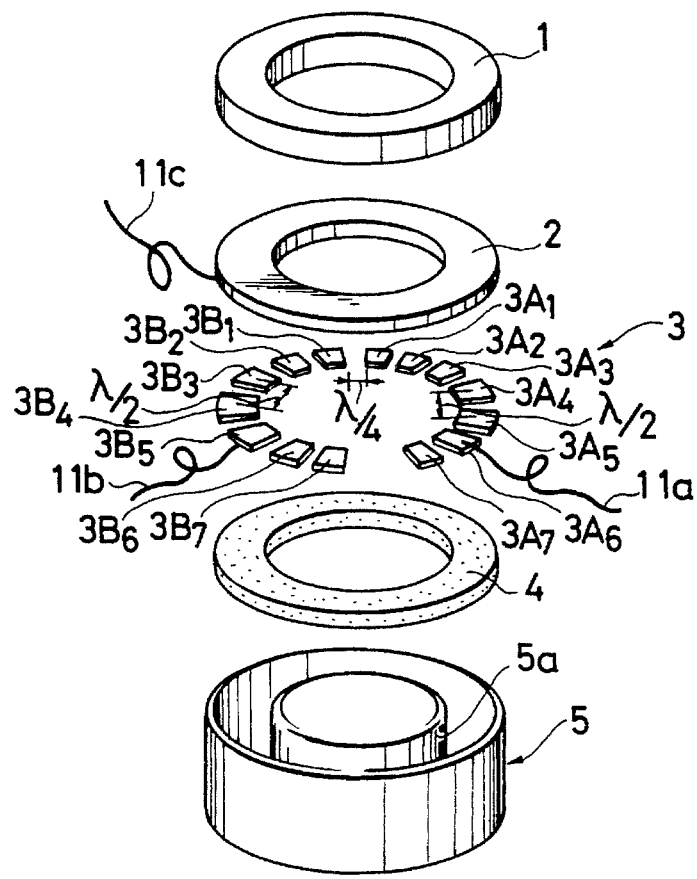
FIG. 1 is a developed view of a structure of a prior art vibration wave motor.
Figure 5:
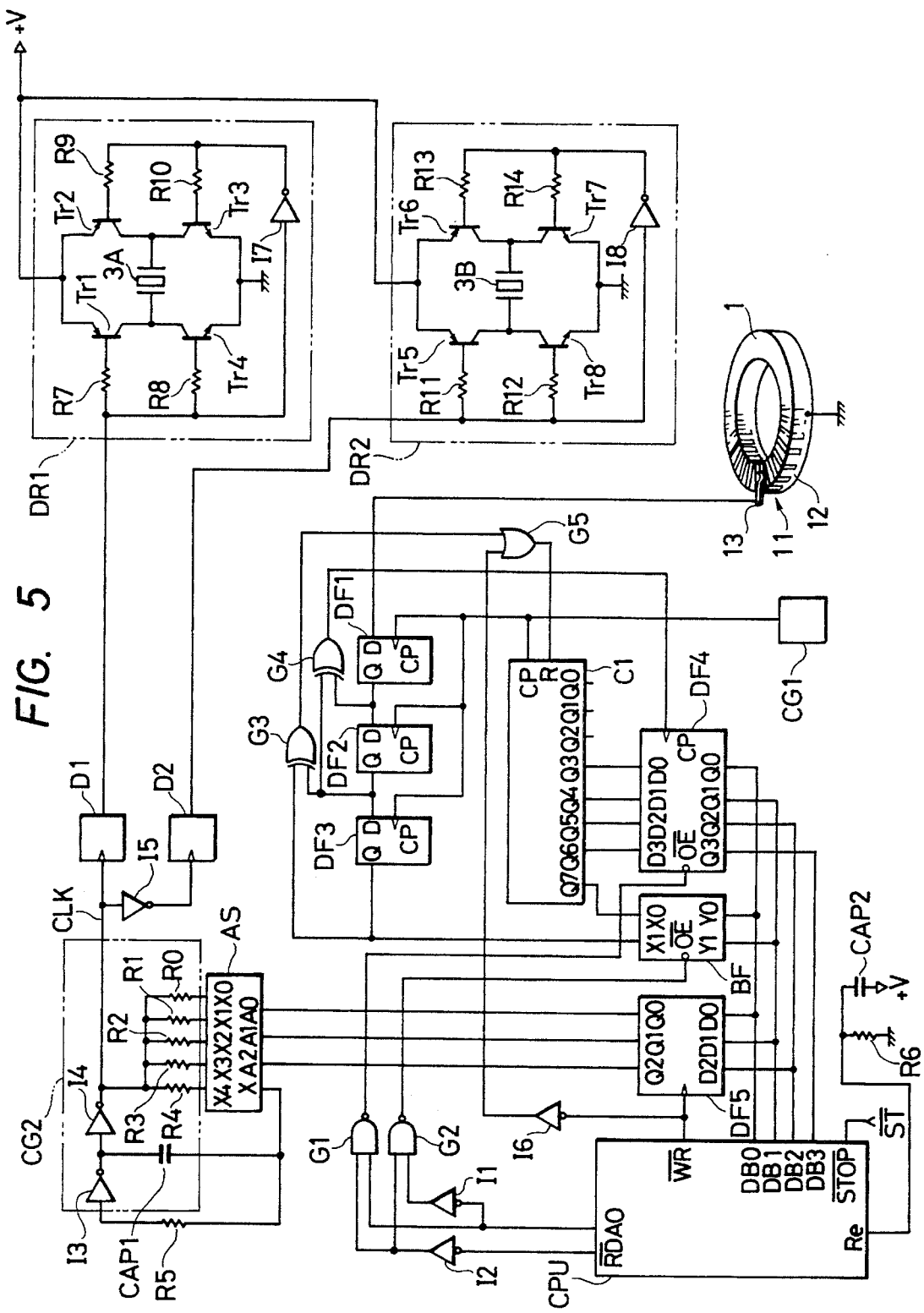
FIG. 5 shows a control circuit for the vibration wave motor, in accordance with a first embodiment of the present invention.

One embodiment of the present invention is now explained. FIG. 5 shows a control circuit for a vibration wave motor. CPU denotes a microcomputer, DF1–DF3 denote D-type flip-flops, DF4 denotes a controllable output circuit having four D-type flip-flops, DF5 denotes a circuit having three D-type flip-flops, BF denotes a tri-state buffer, C1 denotes a counter, CG1 denotes a clock generator, G1 and G2 denote NAND gates, G3 and G4 denote exclusive —OR gates, G5 denotes an OR gate, I1–I8 denote inverters, D1 and D2 denote frequency dividers, AS denotes an analog multiplexor, R0–R14 denote resistors, CAP1 and CAP2 denote capacitors, Tr1–Tr8 denote transistors, numerals 3A and 3B denote electrostrictive elements mounted on a vibration wave motor (corresponding to one of $3A_1$–$3A_7$ and one of $3B_1$–$3B_7$ shown in FIG. 1), and numeral 11 denotes a rotary comb-shaped switch having a brush electrode 13 which contacts to a comb-shaped electrode 12 mounted on a rotor (movable member) so that a circuit is opened and closed as the rotor 1 rotates.

Figure 6:
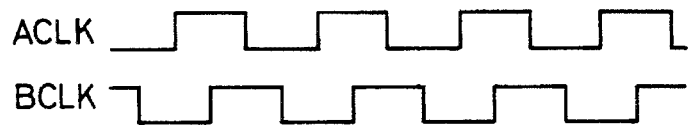
FIG. 6 shows an output waveform of a frequency divider shown in FIG. 5.

The inverters I3 and I4, the capacitor CAP1 and the resistors R0–R4 having gradually increasing resistances form a clock generator CG2. The analog multiplexor AS selects one of terminals X0–X4 by a digital input at terminals A0–A2 and connects the selected terminal to a terminal X. Thus, one of the resistors R0–R4 is selected by the digital signal so that the clock generator CG2 generates an oscillation output CLK of different frequency. The frequency dividers D1 and D2 divide the input frequency upon the rise of the clock output CLK. Because the output of the frequency divider D2 is supplied to the inverter I5, phase-shifted outputs ACLK and BCLK are produced as shown in FIG. 6.

Those clock outputs are supplied to the drivers DR1 and DR2, respectively. The driver DR1 comprises a push-pull circuit driven by the output waveform ACLK and it applies a periodic voltage to the electrostrictive element 3A. The driver DR2 is driven by the output waveform BCLK and applies a λ/4 phase-shifted periodic voltage to the electrostrictive element 3B.

The flip-flops DF1, DF2 and DF3 function as a shift register and clock input terminals CP thereof are connected to the clock generator CG1 so that the signal from the brush 13 is sequentially shifted at the rise of the clock. The counter C1 counts the clock from the clock generator CG1.

The flip-flop DF4 has a tri-state output stage and produces output signals at terminals Q0–Q3 by an L-input at a terminal $\overline{OE}$.

The inputs D0–D3 to the flip-flop DF4 are latched at the rise of the output from the exclusive —OR gate G4 connected between the input terminal and the output terminal of the flip-flop DF2, and when the output of the exclusive —OR gate G3 connected between the input terminal and the output terminal of the flip-flop DF3 assumes an H-level, the counter C1 is reset through the OR gate G5.

Immediately after the signal from the brush 13 changes, the outputs Q3–Q6 of the counter C1 are latched in the flip-flop DF4 and the counter C1 is reset immediately thereafter, then the reset of the counter is released and the counter C1 again starts to count. This operation is carried out for each change of the signal from the brush 13.

The output Q of the flip-flop DF3 and the most significant bit output Q7 of the counter C1 are applied to the input terminals X1 and X0 of the tri-state buffer BF, which produces Y1 and Y0 by the L-input at the terminal $\overline{OE}$. The outputs of the flip-flop DF4 and the buffer BF are supplied to data bus lines DB0–DB3 of the microcomputer CPU. When a read signal $\overline{RD}$ which is produced when the CPU reads in an external data is L-level and an address signal A0 is L-level, the output of the NAND gate G2 is L-level and the L-signal is applied to the terminal $\overline{OE}$ of the buffer BF. When the address signal A0 is H-level, the output of the NAND gate G1 is L-level, which is supplied to the terminal $\overline{OE}$ of the flip-flop DF4 so that the outputs Q0–Q3 are read into the CPU.

When the CPU outputs the signal, a write signal $\overline{WR}$ assumes L-level and the flip-flop DF5 latches the data bus signal of the CPU. The output of the flip-flop DF5 is supplied to the analog multiplexer AS, which selects one of the resistors R0–R4.

The signal $\overline{WR}$ resets the counter C1 through the inverter I6 and the OR gate G5. An integration circuit including the capacitor CAP2 and the resistor R6 is connected to a terminal Re to reset the CPU when the power supply is turned on.

The above operation is explained with reference to a program flow chart of FIG. 7.

When the power supply is turned on, the microcomputer CPU is reset and the program counter is reset to zero. Thus, the program is started from the top of the flow chart.

A variable K is set to zero and the content of the register RG1 is set to a maximum value (15) for four bits (K=0, RG1=15).

The variable K is outputted to the data bus (OUT K). Since K=0, the output of the flip-flop DF5 is 0 and the resistor R0 is selected by the analog multiplexer AS. Since the resistance of the resistor R0 is smallest among the resistors R0–R4, the output waveform CLK has a highest frequency.

The write signal $\overline{WR}$ of the CPU resets the counter C1 through the inverter I6 and the OR gate G5.

An address 0 is then inputted (INPUT AD0). Since the output A0 of the CPU is now L-level, the output of the buffer BF is supplied to the CPU through the data bus. The bit 1 of the data is checked to determine if it is "0" or "1". It is the discrimination of the output Q of the flip-flop DF3. If the bit 1 is "0", that is, if the brush 13 contacts to the electrodes 12, the program proceeds to a step WAT. Then, the bit 0 received in the step INPUT AD0 is checked. The bit 0 is the output Q7 of the counter C1 and it is still "0" since the initial reset. Thus, the program returns to a step IN1.

While the program repeats this loop, the vibration wave motor rotates, and when the brush 3 comes to a position where it does not contact to the electrode 12, that is, when the switch 11 is opened, the output Y1 of the buffer BF assumes H-level after the delay times of the flip-flops DF1–DF3, and the program goes out of the loop and proceeds to a step IN2.

In the step IN2, the address 0 is again inputted (INPUT AD0) and the bit 0 is checked. This branch command and the branch command in the step WAT detect a condition in which the vibration wave motor stops or rotates at a very low speed. When the counter C1 counts up to the most significant bit position, the terminal Q7 assumes H-level and the bit 0 assumes "1". Thus, the program jumps to a step NXT. This command detects the low speed condition to save waste of low speed control time of the motor.

The bit 1 of the data inputted in the step IN2 is checked. The loop up to the step IN2 is repeated until the brush 13 contacts to the next contact of the electrode 12. When the bit 1 changes to "0", the program proceeds to a step IN3 and the address 1 is inputted (INPUT AD1). The output of the flip-flop DF4 is read in.

As described above, the flip-flop DF4 latches the outputs Q3–Q6 of the counter C1 immediately after the change of the signal from the brush 13. Thus, the value corresponding to the open-state time of the switch 11 can be inputted to the CPU.

The value (DATA) inputted in the step IN3 is compared with the content of the register RG1. Since G1=15 initially, the DATA must be smaller than 15 and the program proceeds to a step MN, where the DATA is stored in the register RG1 (DATA→RG1) and the variable K is stored in the register RG2 (K→RG2).

The program proceeds to the step NXT where the value K is incremented (K+1→K). If the DATA is larger than or equal to the content of the register RG1, the contents of the registers RG1 and RG2 are unchanged and the program proceeds to the step NXT.

The value K is then compared with "5". Since K is now equal to "1", the program returns to the step FST. The value K is set to 1 to select the resistor R1 and the program proceeds in the same manner.

In this manner, the resistors R0–R4 are sequentially selected to change the frequency of the applied voltage while the vibration wave motor is rotated.

When the variable K reaches "5", a count corresponding to a highest speed of the vibration wave motor is stored in the register RG1, and the value K at that moment is stored in the register RG2.

The program branches to the step FNS by the branch command of K=5 and the content of the register RG2 is read out. Thus, the registor which results in the highest speed of the vibration wave motor is selected from the resistors R0–R4 to control the output CLK of the clock generator CG2. Then, the program terminates.

The output CLK is applied to the frequency drivers D1 and D2, and the periodic voltages determined by the output ACLK of the frequency divider D1 and the output BCLK of the frequency divider D2 are applied to the electrostrictive elements 3A and 3B through the drivers DR1 and DR2, respectively.

The frequency of the periodic voltage is thus controlled to assure an optimum resonance to the shape and the size of the vibration member so that the motor is driven at the highest speed and the drive efficiency is very high.

Since the control is effected at the start of the drive of the motor, the motor is always controlled optimally even if a condition of operation changes for each drive. Fine adjustment of frequency in the manufacturing process is not necessary and the manufacturing process time can be reduced.

While the rotary comb-shaped switch is shown as the output means for the speed signal of the motor in the above embodiment, a photo-electric converter which uses an optical pattern and a photosensitive device or a magneto-electric converter which uses a magnetic pattern and a Hall effect device may be used to generate the speed signal.

While the counter is used to measure the speed in the above embodiment, the signal from the brush may be directly applied to the microcomputer and it may be time-operated by a software. The speed measurement is, therefore, not limited to the hardware counter.

The output waveforms of the frequency dividers are not limited to the rectangular waves ACLK and BCLK shown in FIG. 6 but sine waves may be used to drive the vibration wave motor.

Figure 7:
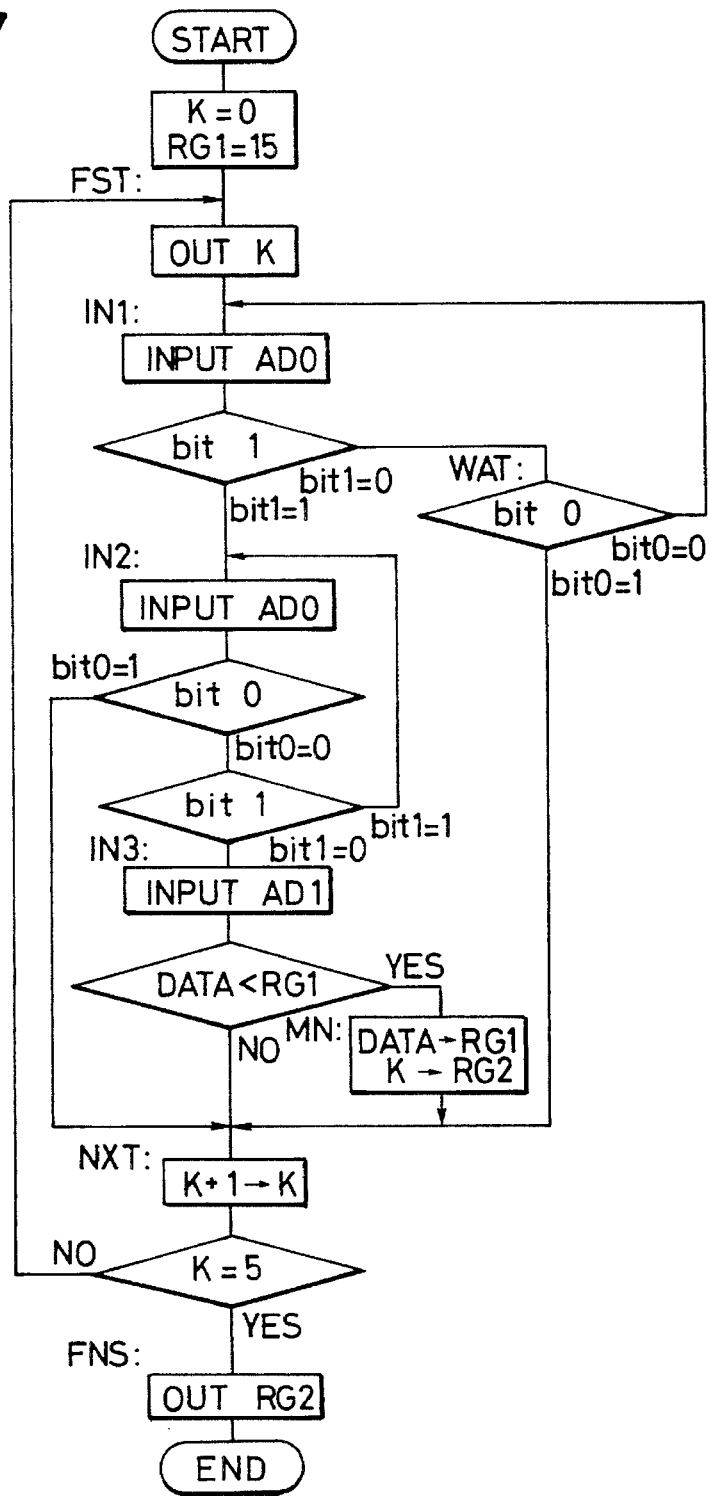
FIG. 7 shows a flow chart of an operation sequence of the circuit shown in FIG. 5.
Figure 8:
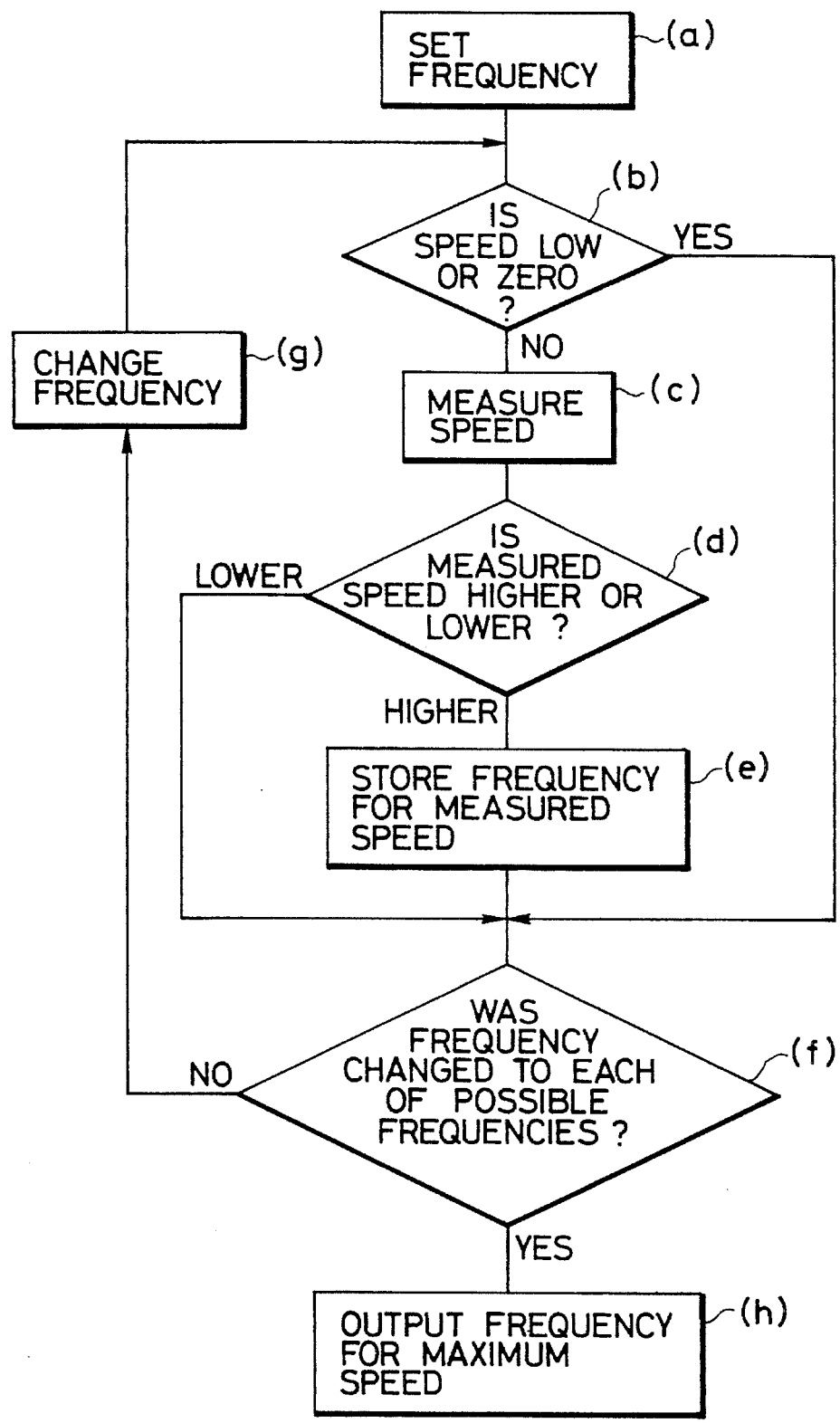
FIG. 8 shows a flow chart of steps for controlling the vibration wave motor in accordance with the flow chart shown in FIG. 7, FIGS. 9a and 9b show flow charts of another operation sequence of the circuit shown in FIG. 5.

FIG. 8 shows a flow chart of steps for controlling the vibration wave motor in accordance with the flow chart shown in FIG. 7. In a step a, the periodic voltage to be applied to the electrostrictive elements of the vibration wave motor is set. In a step b, it is checked if the rotating speed of the movable member 1 of the vibration wave motor is very low or zero. If it is very low or zero, the process goes to a step f. If the rotating speed is higher than a predetermined speed, the process goes to a step c where the velocity is measured.

In a step d, the speed measurement at the initially set frequency is compared with a reference speed, the speed measured at initially set frequency is compared with a predetermined reference speed and the speeds measured at sequentially varied frequencies are compared with the speed measured at the previous frequencies, and if the former is lower, the process goes to the step f, and if the former is higher, the process goes to a step e. In the step e, the frequency for the measured speed is stored.

Accordingly, only when the speed gradually increases, the frequency is sequentially updated and stored.

In the step f which follows to the step b, c or e, it is checked if the frequency was changed to each of the possible frequencies, and if not, the frequency is changed in a step g and the step b and the subsequent steps are repeated. If all frequencies were completed, the stored frequency is outputted in a step h. The speed at this frequency is the maximum speed.

Figure 9A:
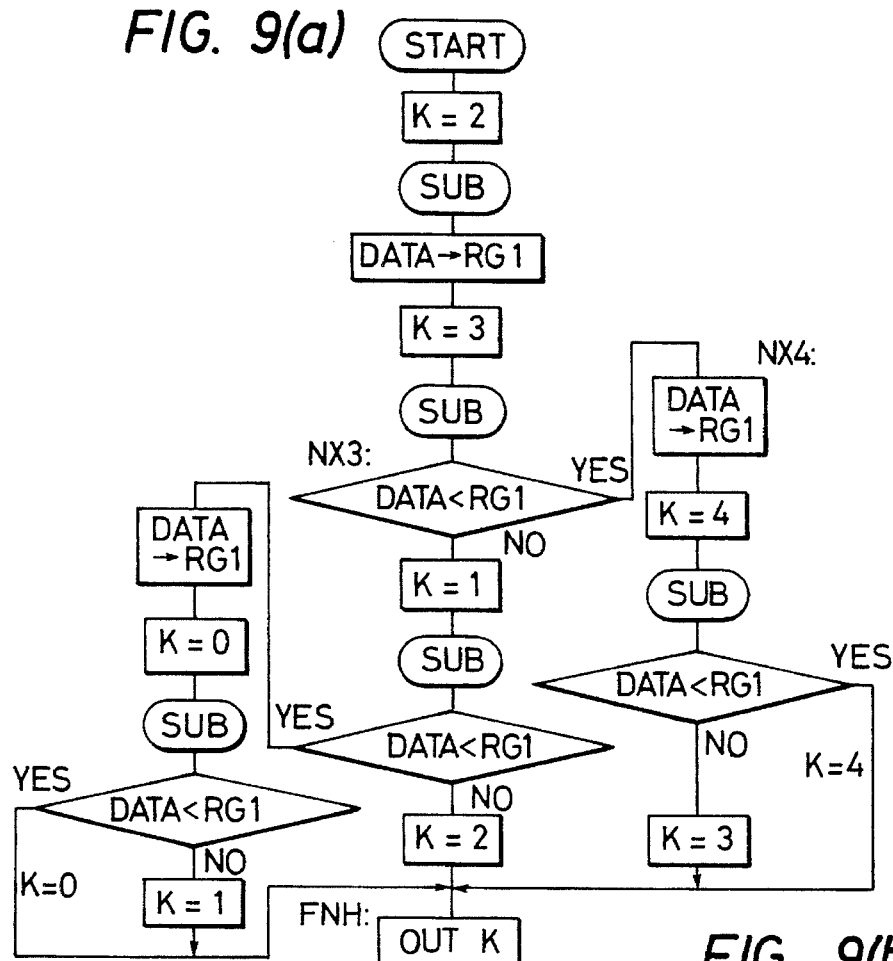
Figure 9B:
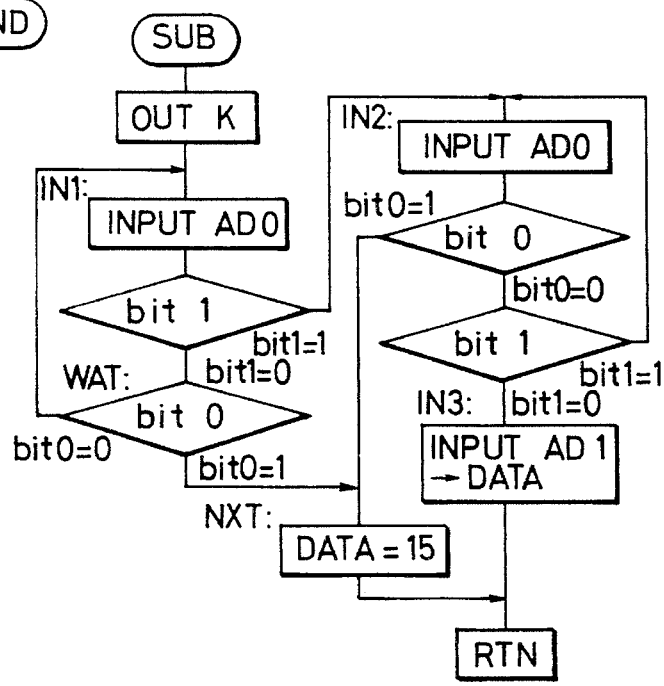

A second embodiment of the operation of the circuit shown in FIG. 5 is explained with reference to a program flow chart shown in FIG. 9.

When the power supply is turned on, the microcomputer CPU is reset and the program counter is reset to "0". Thus, the program starts from the top of the flow chart of FIG. 9a.

The variable K (0–4) for the resistors R0–R4 is set to "2" intermediate of the range (K=2). Then, the program proceeds to a subroutine SUB shown in the flow chart of FIG. 9b.

The value K is outputted to the data bus (OUT K). Since K=2, the output of the flip-flop DF5 is "2" and the resistor R2 is selected by the analog multiplexer AS. Since the resistance of the resistor R2 is intermediate of those of the resistors R0–R4, the output wave CLK has a frequency around a center of the frequency range.

The write signal $\overline{WR}$ of the CPU resets the counter C1 through the inverter I6 and the OR gate G5.

The address 0 is then inputted (INPUT AD0). Since the output A0 of the CPU is L-level, the output of the buffer BF is supplied to the CPU through the data bus. The bit 1 of the data is checked to determine if it is "0" or "1". This is the discrimination of the output Q of the flip-flop DF3. If the bit 1 is "0", that is, if the brush 13 contacts to the electrode 12, the program proceeds to a step WAT. The bit 0 of the data inputted in the step INPUT AD0 is then checked. The bit 0 is the output Q7 of the counter C1 and it is still "0" immediately after the reset. Thus, the program returns to the step IN1.

While the program repeats this loop, the vibration wave motor is rotated, and when the brush 13 comes to a position in which it does not contact to the electrode 12, that is, when the switch 11 is opened, the output Y1 of the buffer BF assumes H-level after the delay times of the flip-flops DF1–DF3. Thus, the program goes out of the loop and proceeds to the step IN2.

In the step IN2, the address 0 is again inputted (INPUT AD0) and the bit 0 is checked. This branch command and the branch command in the step WAT detect a condition in which the vibration motor is stopped or rotates at a very low speed. When the counter C1 counts up to the most significant bit Q7, the terminal Q7 assumes H-level and the bit 0 assumes "1". Thus, the program jumps to the step NXT where the minimum value 15 for the four bits is set (DATA= 15). Thus, this command detects the low speed to save waste of time to control the motor to the maximum speed.

The bit 1 of the data inputted in the step IN2 is then checked. The loop up to the step IN2 is repeated until the brush 13 contacts to the next contact of the electrode 12. When the bit 1 changes to "0", the program proceeds to the step IN3 and the address 1 is inputted (INPUT AD1). The output of the flip-flop DF4 is read and it is set as the DATA.

The subroutine is terminated and the program returns to the main routine (RTN).

In the main routine, the DATA corresponding to the measured speed is stored in the register RG1 (DATA→ RG1). Then, the value K is set to "3" and the subroutine SUB is again executed. Namely, the resistor R3 is selected and the speed is measured. The subroutine SUB was explained above and the explanation is omitted here.

In a step NX3, the DATA measured in the subroutine SUB is compared with the content of the register RG1 (the DATA for K=2), and if the latter is larger, that is, when the speed for K=3 is higher, the program jumps to a step NX4 and the DATA for K=3 is stored in the register RG1 (DATA→RG1).

Then, the value K is set to "4" and the subroutine SUB is executed. Namely, the resistor R4 is selected and the speed is measured. The DATA is compared with the content of the register RG1, and if the latter is larger, the speed for K=4 is maximum and the program proceeds to a step FNH. If the content of the register RG1 is smaller, the speed for K=3 is maximum, and the value K is set to "3" and the program proceeds to the step FNH.

In the step NX3, if the content of the register RG1 is smaller, the value K is set to "1" and the similar program is executed. This step is similar to the step NX4 and the explanation is omitted. The DATA for K=1 is compared with the content of the register RG1, and if the latter is smaller, the speed for K=2 is maximum and the program proceeds to the step FNH. If the content of the register RG1 is larger, the DATA for K=1 is stored in the register RG1 and it is compared with the DATA for K=0. If the former is smaller, the speed for K=1 is maximum and the value K is set to "1" and the program proceeds to the step FNH. If the content of the register RG1 is larger, the speed for K=0 is maximum and the value K is set to "0" and the program proceeds to the step FNH.

In the step FNH, the value K is outputted.

In this manner, one of the values 0–4 for K which results in the maximum speed is outputted and the corresponding one of the resistors R0–R4 is selected in accordance with the value K to control the output CLK of the clock generator CG2. The frequency dividers D1 and D2 are driven by the output CLK. The periodic voltages of the frequencies determined by the output ACLK of the frequency divider D1 and the output BCLK of the frequency divider D2 are applied to the electrostrictive elements 3A and 3B by the drivers DR1 and DR2, respectively.

The frequency of the periodic voltages is controlled to assure an optimum resonance for the shape and the size of the vibration member and the motor speed is maximum and the drive efficiency is very high.

Figure 10:
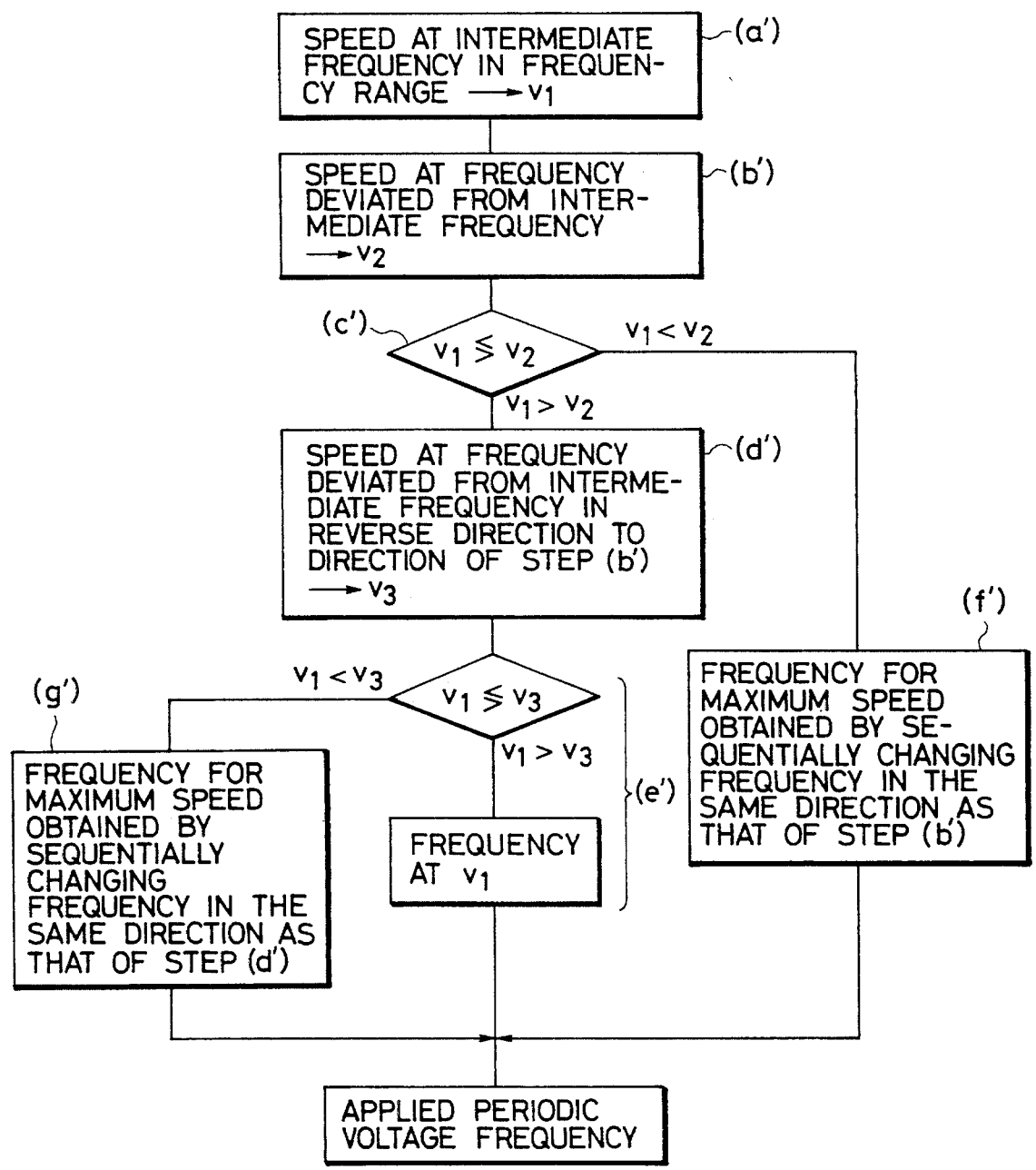
FIG. 10 shows a flow chart of steps for controlling the vibration wave motor in accordance with the flow charts shown in FIGS. 9a and 9b.

FIG. 10 shows steps for controlling the vibration wave motor in accordance with the flow chart shown in FIG. 9.

In a step a', the frequency is set to an intermediate of the frequency range and a speed $v_1$ of the movable member at that frequency is measured.

In a step b', a speed $v_2$ of the movable member at a speed deviated from the intermediate frequency set in the step a' is measured. In the step b', the frequency is changed, for example, in the increasing direction.

In a step c', the speeds $v_1$ and $v_2$ measured in the steps a' and b' are compared, and if the speed $v_1$ is higher, the process proceeds to a step d', and if the speed $v_2$ is higher, the process proceeds to a step f'.

In the step d', a speed $v_3$ at a frequency lower than the frequency set in the step a' is measured.

In a step e', the speeds $v_1$ and $v_3$ measured in the steps a' and d' are compared, and if the speed $v_3$ is higher, the process proceeds to a step g', and if the speed $v_1$ is higher, the frequency for that speed is outputted.

In the step f', the frequency is sequentially increased and the speeds at the respective frequencies are compared, and the frequency for the maximum speed is outputted.

In the step g', the frequency is sequentially decreased and the speeds at the respective frequencies are compared, and the frequency for the maximum speed is outputted.

If the frequency was changed to a lower frequency in the step b', the frequency is sequentially lowered in the step f', and in the step f' the frequency is changed above the frequency set in the step a', and in the step g' the frequency is sequentially increased.

The voltage of the frequency outputted in the step e', f' or g' is applied to drive the vibration wave motor.

A second embodiment of the present invention is now explained with reference to FIGS. 11 and 12.

Figure 11:
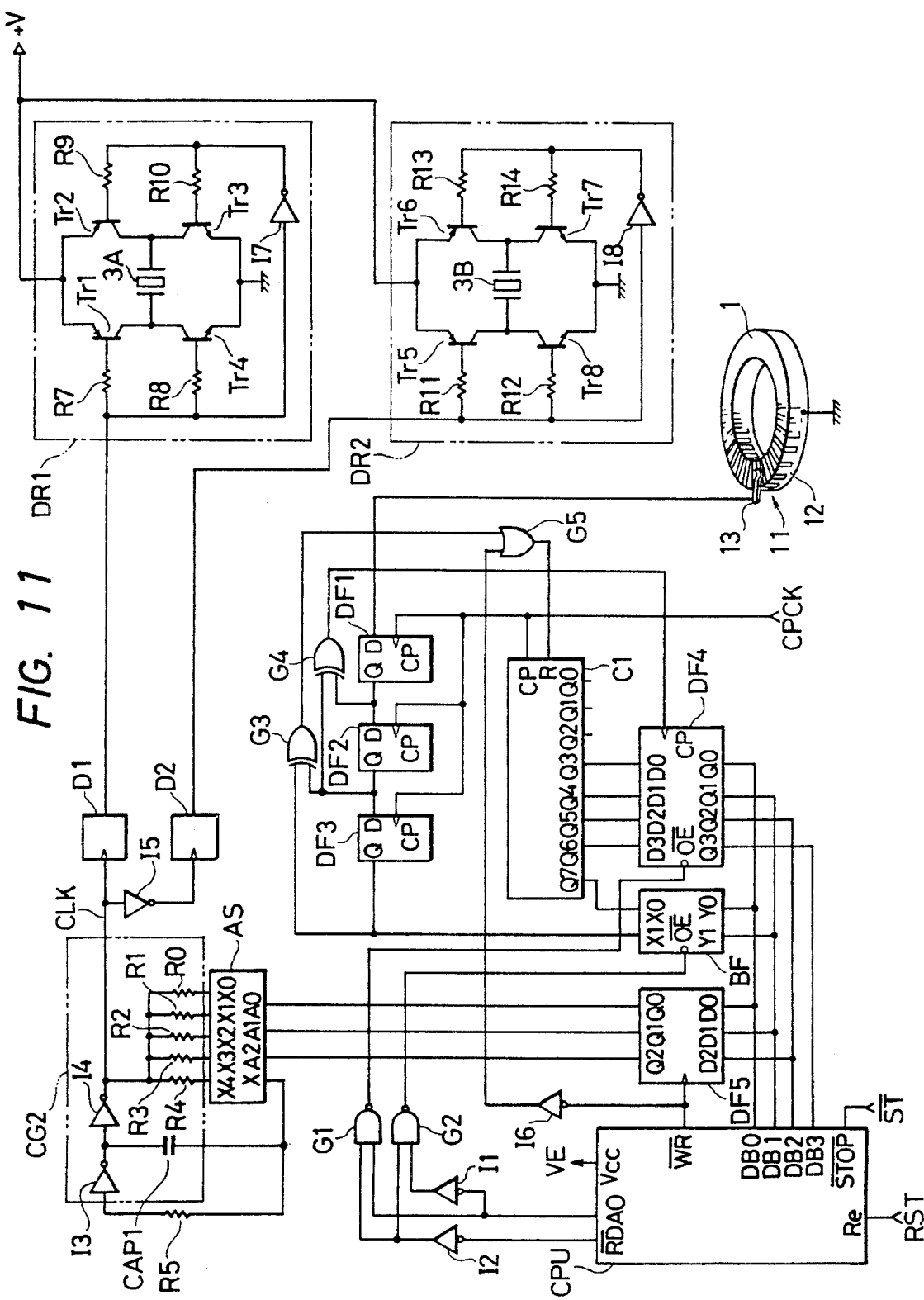
FIG. 11 shows a control circuit for the vibration wave motor in accordance with a second embodiment of the present invention.
Figure 12:
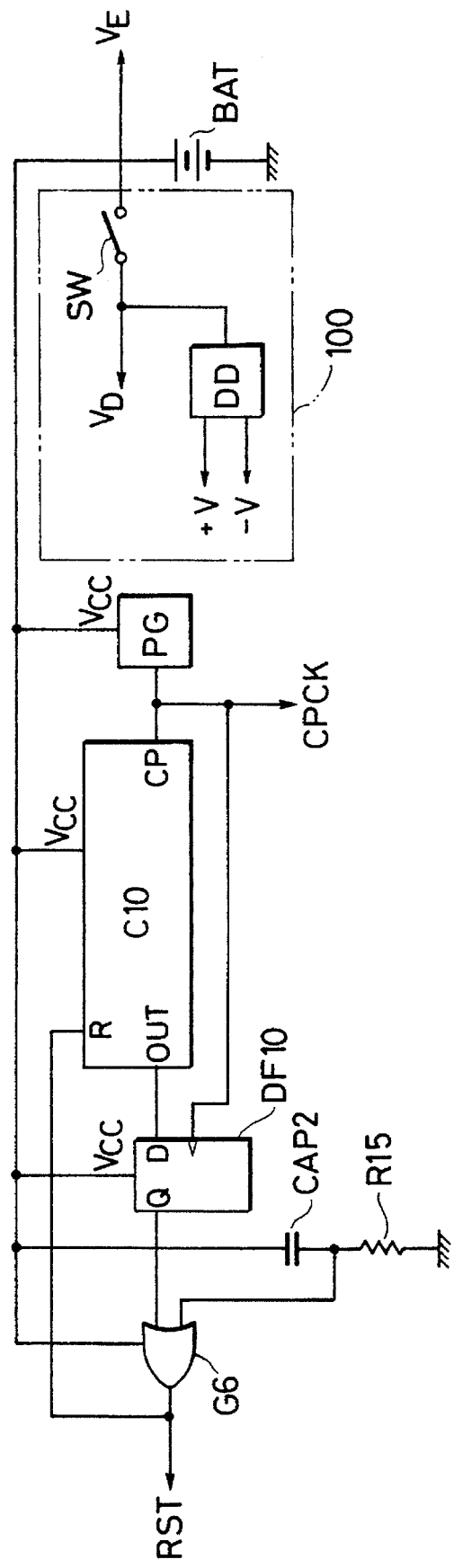
FIG. 12 shows a timer for intermittently driving the circuit of FIG. 11.

FIGS. 11 and 12 show a control circuit for the vibration wave motor. The like elements to those shown in FIG. 5 are designated by the like numerals and the explanation thereof is omitted.

In FIG. 11, a signal RST is applied to the reset terminal Re of the microcomputer CPU and a signal CPCK is applied to the terminal CP of the flip-flop DF1. The signals RST and CPCK are supplied from the circuit shown in FIG. 12, in which PG denotes a pulse generator, C10 denotes a counter, DF10 denotes a D-type flip-flop, CAP2 denotes a capacitor, R15 denotes a resistor, G6 denotes an OR gate, SW denotes a switch, and DD denotes a DC-DC converter.

An input terminal D of the flip-flop DF10 is connected to a terminal OUT of the counter C10, and an output terminal Q is connected to the reset terminal Re of the CPU (FIG. 10) through the OR gate G6. A power supply Vcc therefor is directly supplied from a battery BAT so that the circuit operates upon the loading of the battery. A line VE is connected to a power supply terminal of the CPU.

The signal RST is produced for a predetermined time from the loading of the battery by an integration circuit comprising the capacitor CAP2 and the resistor R15, and the counter C10 and the CPU are reset and the counter C10 counts the pulse generator PG. When the counter C10 counts the pulse for a predetermined time, the terminal OUT produces an H-signal and the output Q of the flip-flop DF10 changes to H-level at the rise of the clock input CP so that the signal RST is produced. The CPU is again reset and the counter C10 is also reset. The resetting is repeated at the frequency corresponding to the count of the counter C10.

The flip-flops DF1, DF2 and DF3 function as a shift register and clock input terminals thereof are connected to the pulse generator PG so that the signal from the brush 13 is sequentially shifted at the rise of the pulse output CPCK. The counter C1 counts the pulse output CPCK from the pulse generator PG.

The operation of the circuit is explained with reference to the program flow chart of FIG. 7.

When the battery BAT is loaded, the power is supplied to the microcomputer CPU and the CPU is reset by the signal RST from the OR gate G6 and the program counter is reset to zero. Thus, the program starts from the top of the flow chart.

The variable K is initially set to "0" and the content of the register RG1 is set to a maximum value 15 for four bits (K=0, RG1=15). The larger the content of the resister RG1, the lower is the speed.

The value K is outputted to the data bus (OUT K). Since K=0, the output of the flip-flop DF5 is "0" and the registor R0 is selected by the analog multiplexer AS. Since the resistance of the registor R0 is smallest of those of the resistors R0–R4, the output wave CLK has a highest frequency.

The write signal $\overline{WR}$ of the CPU resets the counter C1 through the inverter I6 and the OR gate G5.

The address 0 is then inputted (INPUT AD0). Since the output A0 of the CPU is now L-level, the output of the buffer BF is supplied to the CPU through the data bus. The bit 1 of the data is checked to determine whether it is "0" or "1".

This is the discrimination of the output Q of the flip-flop DF3. If the bit 1 is "0" that is when the brush 13 contacts to the electrode 12, the program proceeds to the step WAT. The bit 0 of the data inputted in the step INPUT AD0 is checked. The bit 0 is the output Q7 of the counter C1 and it is still "0" immediately after the reset. Thus, the program returns to the step IN1.

While the program repeats this loop, the vibration wave motor rotates and when the brush 13 comes to a position in which it does not contact to the electrode 12, that is, when the switch 11 is opened, the output Y1 of the buffer BF changes to H-level after the delay times of the flip-flops DF1–DF3. Thus, the program goes out of the loop and proceeds to the step IN2.

In the step IN2, the address 0 is again inputted (INPUT AD0) and the bit 0 is checked. This branch command and the branch command in the step WAT detect a condition in which the vibration wave motor stops or rotates at a very low speed. When the counter C1 counts up to the most significant bit Q7, the terminal Q7 produces H-signal and the bit 0 assumes "1". Thus, the program jumps to the step NXT. This command detects the low speed condition to save waste of time to control the motor to the maximum speed.

Then, the bit 1 of the data inputted in the step IN2 is checked. The loop up to the step IN2 is repeated until the brush 13 contacts to the next contact of the electrode 12. When the bit 1 changes to "0", the program proceeds to the step IN3 where the address 1 is inputted (INPUT AD1). The output of the flip-flop DF4 is read in.

As described above, the flip-flop DF4 latches the outputs Q3–Q6 of the counter C1 immediately after the change of the signal from the brush 13. Thus, the value corresponding to the open-state time of the switch 11 can be inputted to the CPU.

The value (DATA) inputted in the step IN3 is compared with the content of the register RG1. Since G1=15 initially, the DATA must be smaller than 15 and the program proceeds to a step MN, where the DATA is stored in the register RG1 (DATA→RG1) and the variable K is stored in the register RG2 (K→RG2).

The program proceeds to the step NXT where the value K is incremented (K+1→K). If the DATA is larger than or equal to the content of the register RG1, the contents of the registers RG1 and RG2 are unchanged and the program proceeds to the step NXT.

The value K is then compared with "5". Since K is now equal to "1", the program returns to the step FST. The value K is set to 1 to select the registor R1 and the program proceeds in the same manner.

In this manner, the resistors R0–R4 are sequentially selected to change the frequency of the applied voltage while the vibration wave motor is rotated.

When the variable K reaches "5", a count corresponding to a highest speed of the vibration wave motor is stored in the register RG1, and the value K at that moment is stored in the register RG2.

The program branches to the step FNS by the branch command of K=5 and the content of the register RG2 is read out. Thus, the resistor which results in the highest speed of the vibration wave motor is selected from the resistors R0–R4 to control the output CLK of the clock generator CG2. Then, the program terminates.

A predetermined time after the execution of the above program after the loading of the battery BAT, the signal RST is produced from the OR gate G6 so that the above program is repeatedly executed and the output CLK is produced.

The output CLK is applied to the frequency dividers D1 and D2, and the periodic voltages determined by the output ACLK of the frequency divider D1 and the output BCLK of the frequency divider D2 are applied to the electrostrictive elements 3A and 3B through the drivers DR1 and DR2, respectively.

The frequency of the periodic voltage is thus controlled to assure an optimum resonance to the shape and the size of the vibration member so that the motor is driven at the highest speed and the drive efficiency is very high.

Since the control is effected at the start of the drive of the motor, the motor is always controlled optimally even if a condition of operation changes for each drive.

A third embodiment of the present invention is explained with reference to FIGS. 13 and 14.

Figure 13:
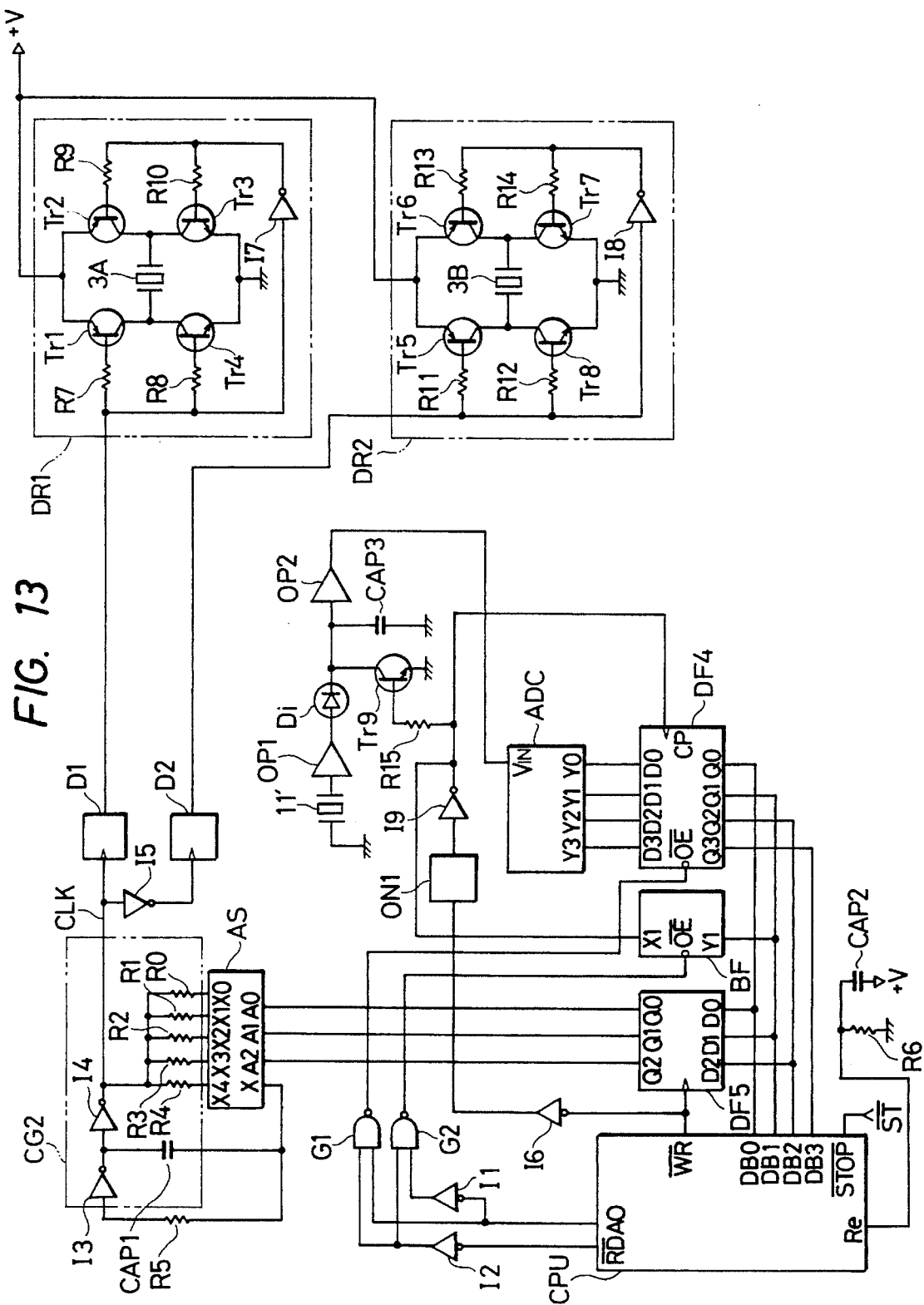
FIG. 13 shows a control circuit for the vibration wave motor in accordance with a third embodiment of the present invention.
Figure 14:
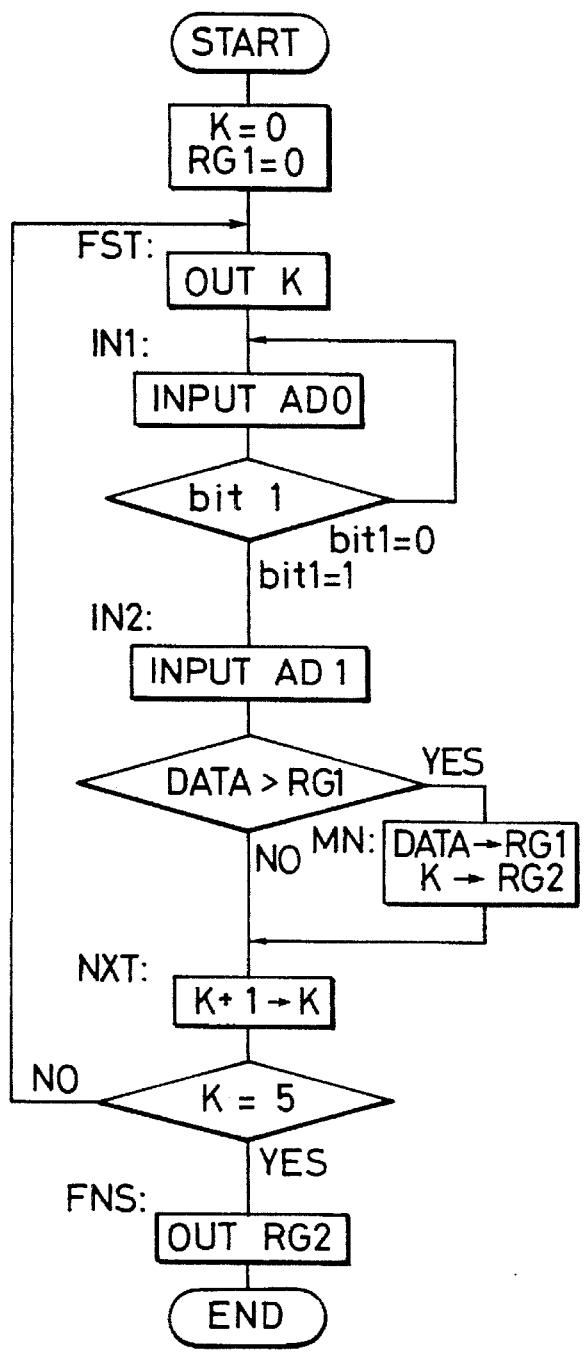
FIG. 14 shows a flow chart of an operation sequence of the circuit shown in FIG. 13.

FIG. 13 shows a control circuit for the vibration wave motor. The like elements to those shown in FIG. 5 are designated by the like numerals and the explanation thereof is omitted.

Numeral 19 denotes an inverter, R15 denotes a resistor, CAP3 denotes a capacitor, Tr9 denotes a transistor, Di denotes a diode, ADC denotes an analog-digital converter, ON1 denotes a one-shot circuit, and OP1 and OP2 denote buffer amplifiers. Numerals 3A and 3B denote electrostrictive elements mounted on the vibration member 2 of the vibration wave motor and numeral 11' denotes an electrostrictive element mounted on the vibration member 2 adjacently to the electrostrictive elements 3A and 3B (see FIG. 15).

The vibration of the vibration member 2 is transmitted to the electrostrictive element 11', which generates an electromotive force. The larger the amplitude of the vibration of the vibration member 2 is, that is, the higher the resonance is, the larger is the output voltage of the electrostrictive element 11'.

The output voltage of the electrostrictive element 11' is supplied to a peak hold circuit comprising the diode Di and the capacitor CAP3, through the buffer amplifier OP1 and a maximum voltage is stored in the capacitor CAP3. The voltage across the capacitor CAP3 is supplied to an analog voltage input terminal VIN of the converter ADC through the buffer amplifier OP2. The output of the flip-flop DF4 is tri-state and the flip-flop DF4 produces output signals at terminals Q0–Q3 in response to the input to the terminal $\overline{DE}$.

The microcomputer CPU executes the output command to output the data on the output buses DB0–DB3 and output the L-level pulse to the terminal $\overline{WR}$. In response thereto, the flip-flop DF5 latches the data of DB0–DB2. The output at the terminal $\overline{WR}$ is also supplied to the one-shot circuit ON1 through the inverter I6 so that the output thereof is held at H-level for a predetermined time. The H-level signal cuts off the transistor Tr9 through the inverter I9 and the resistor R15 so that the peak hold circuit Di·CAP3 is operated. Thus, a maximum voltage from the electrostrictive element 11 produced during the H-level period of the one-shot ON1 is stored in the capacitor CAP3.

This voltage is converted to a digital signal by the converter ADC and it is latched in the flip-flop DF4 by a trigger signal supplied through the inverter I9 when the output of the one-shot ON1 changes from H-level to L-level.

The tri-state buffer BF receives the signal of the one-shot ON1 at the terminal X1 through the inverter I9 at the L-level of the terminal $\overline{OE}$ and produces an output at the terminal Y1.

An integration circuit comprising the capacitor CAP2 and the resistor R6 is connected to the terminal Re so that the CPU is reset when the power is turned on.

The operation of the circuit is now explained with reference to a program flow chart of FIG. 14.

When the power is turned on, the microcomputer CPU is reset and the program counter is reset to zero. Thus, the program starts from the top of the flow chart.

The variable K is initially set to "0" and the content of the register RG1 is set to a minimum value "0" (K=0, RGI=0).

The value K is outputted to the data bus (OUT K). Since K=0, the output of the flip-flop DF5 is "0" and the resistor RO is selected by the analog multiplexer AS. Since the resistance of the resistor RO is smallest of those of the resistors R0–R4, the output wave CLK has a highest frequency.

The write signal $\overline{WR}$ of the CPU is applied to the one-shot ON1 through the inverter I6.

Then, the address 0 is inputted (INPUT AD0). Since the output A0 of the CPU is L-level, the output of the buffer BF is supplied to the CPU through the data bus. The bit 1 of the data is checked to determine whether it is "0" or "1". This is the discrimination of the output of the inverter I9. If the bit 1 is "0", that is, if the output of the one-shot ON1 is H-level and the peak hold circuit Di·CAP3 is in operation, the program returns to the step IN1.

If the output of the one-short ON1 is H-level, the program repeats the loop and the vibration member 2 of the vibration wave motor continues to vibrate and the rotor (movable member) 1 continues to rotate. When the output of the one-shot ON1 changes to L-level, the program goes out of the loop and proceeds to the step IN2.

In the step IN2, the address 1 is inputted (INPUT AD1) and the output of the flip-flop DF4 is read in.

Since the flip-flop latches the data when the output of the inverter I9 is H-level, the value corresponding to the maximum output from the electrostrictive element 11' during the H-level period of the one-shot ON1 can be inputted to the CPU.

The value (DATA) inputted in the step IN2 is compared with the content of the register RG1. Since RG1=0, the DATA must be larger than "0" and the program proceeds to the step MN, where the DATA is stored in the register RG1 (DATA→RG1) and the value K is stored in the register RG2 (K→RG2).

The program proceeds to the step NXT, where the value K is incremented (K+1→K). If the DATA is smaller than or equal to the content of the register RG1, the contents of the registers RG1 and RG2 are unchanged and the program proceeds to the step NXT.

The value K is then compared with "5". Since K=1, the program returns to the step FST. The value K is set to "1" to select the resistor R1 and the program is executed in a similar manner.

In this manner, the resistors R0–R4 are sequentially selected while the vibration wave motor is rotated so that the frequency of the applied voltage is sequentially lowered.

When the variable K reaches "5", the count for the maximum vibration amplitude of the vibration member is stored in the register RG1 and the value K at that moment is stored in the register RG2.

Thus, the program proceeds to the step FNS by the branch command of K=5 and the content of the register RG2 is outputted so that an optimum one of the resistors R0–R4 is selected to control the output CLK of the clock generator CG2. Then, the program is terminated.

The frequency dividers D1 and D2 are driven by the output CLK. The periodic voltages having the frequencies determined by the output ACLK of the frequency divider D1 and the output BCLK of the frequency divider D2 are applied to the electrostrictive elements 3A and 3B through the drivers DR1 and DR2, respectively.

The frequencies of the periodic voltages are controlled to assure the optimum resonance for the shape and the size of the vibration member so that a maximum vibration amplitude of the vibration member is attained and a drive efficiency is very high.

Since the control is effected at the start of drive of the motor, the optimum condition is always maintained even if the condition of operation changes for each drive. In addition, fine adjustment in the manufacturing process is not necessary and the manufacturing process time can be shortened.

The output waveform of the frequency divider is not limited to rectangular wave ACLK or BCLK shown in FIG. 6 but a sine wave may be used to drive the vibration wave motor.

The present controller is applicable not only to the rotary vibration wave motor but also to a linear vibration wave motor.

Figure 2:
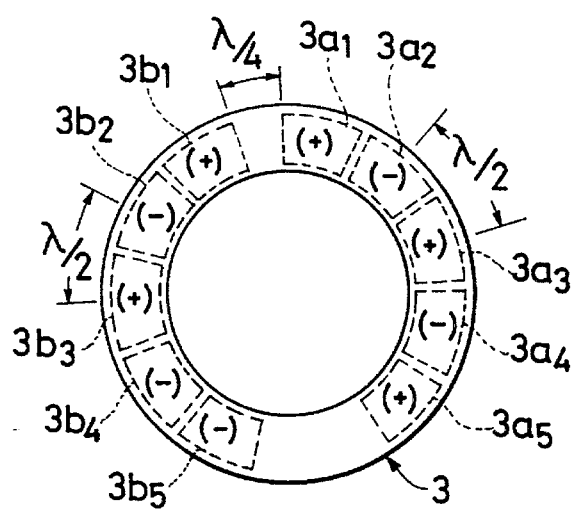
FIG. 2 shows a polarized electrostrictive device of FIG. 1.
Figure 3:
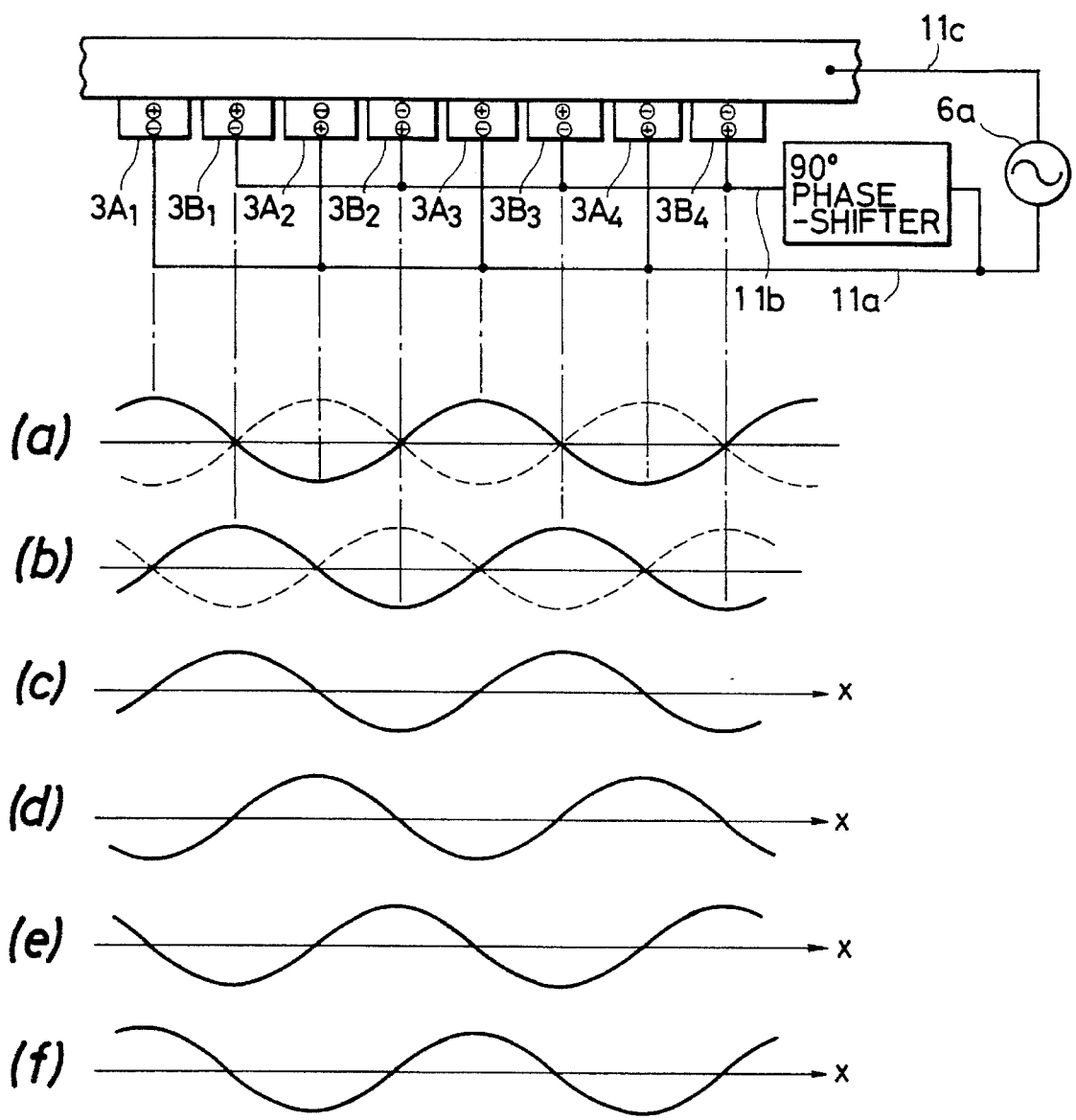
FIG. 3 illustrates drive of a vibration wave motor.
Figure 4:
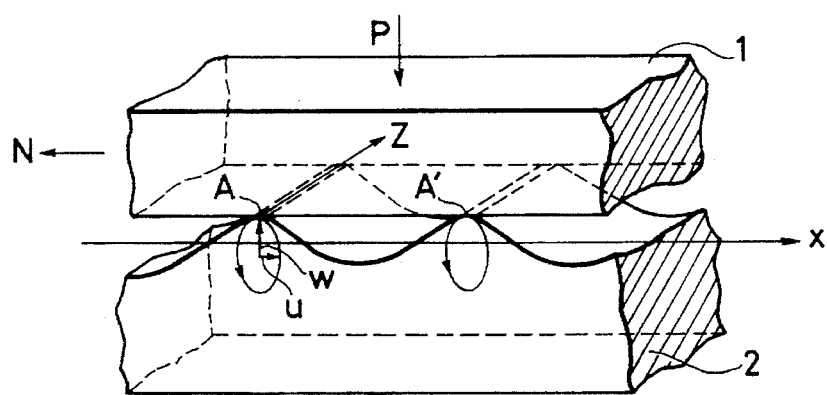
FIG. 4 illustrates a principle of a vibration wave motor.
Figure 15:
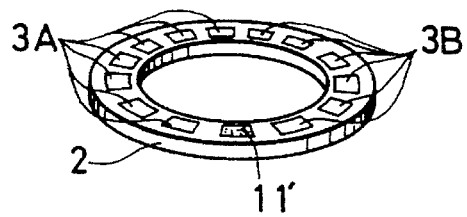
FIG. 15 is a perspective view of a vibration member used in the circuit of FIG. 13.

When the ring-shaped single element 3 shown in FIG. 2 is used, a polarized region is formed at the position of the electrostrictive element 11' shown in FIG. 15, that is, between the elements $3a_5$ and $3b_5$ and an electromotive force therefrom is detected to detect the vibration amplitude of the single element 3 without being affected by the vibration of the vibration member 2.

Figure 16:
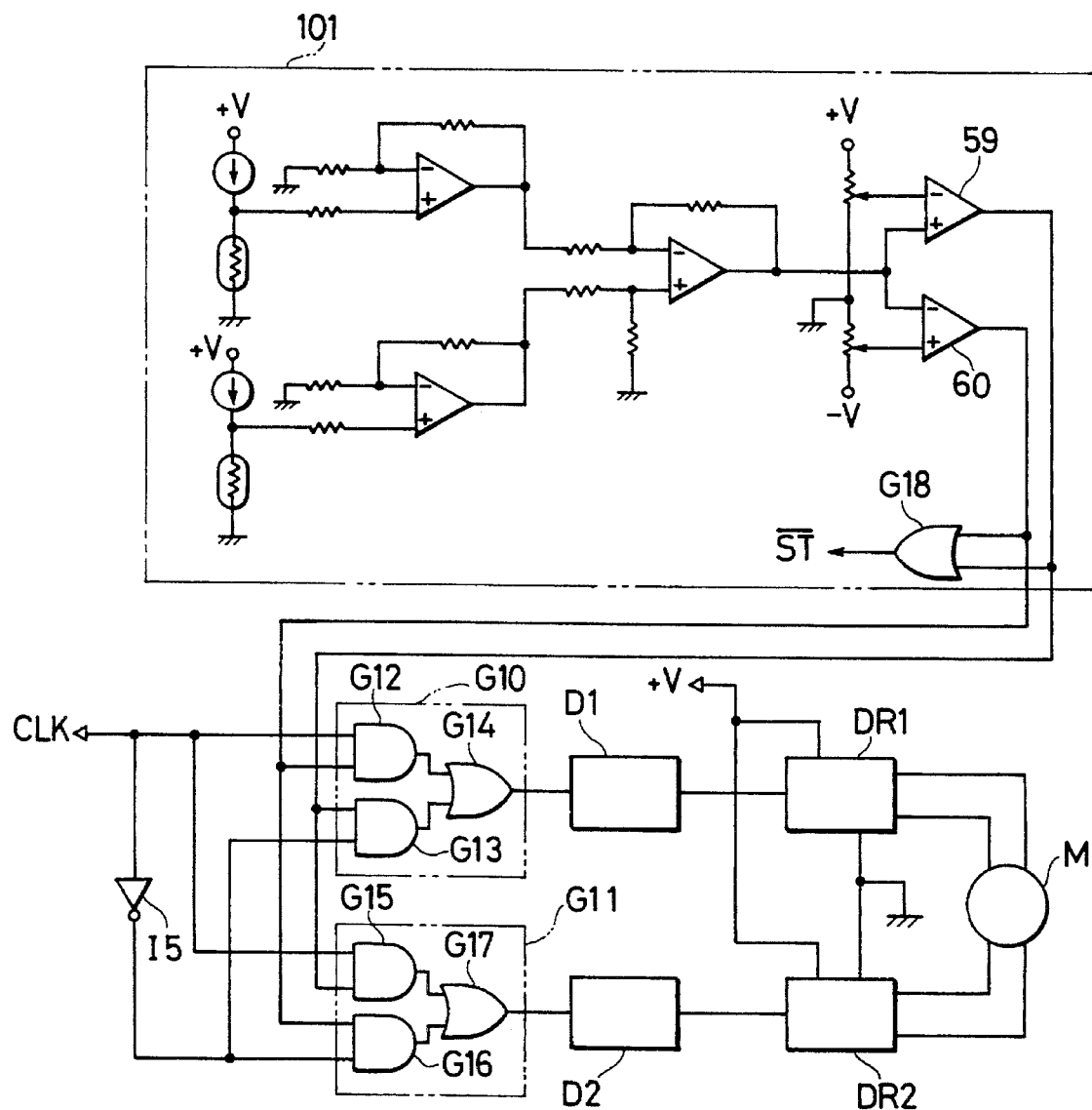
FIG. 16 shows a control circuit for an auto-focus mechanism incorporating the vibration wave motor.

FIG. 16 shows an application of the vibration wave motor in which it is used to drive an auto-focus lens of a camera. An auto-focus circuit 101 per se is disclosed in Japanese Patent Application Laid-Open No. 155337-1980 and hence it is not explained here.

The circuit comprises the circuit shown in FIG. 5, the auto-focus circuit 101 and selection gates G10 and G11.

In an in-focus state, outputs of both comparators 59 and 60 are L-level, and in a defocus state, the output of one of the comparators is H-level and the outputs of the comparators are applied to the selection gate G10 comprising AND gates G12 and G13 and an OR gate G14 and the selection gate G11 comprising AND gates G15 and G16 and an OR gate G17 so that the vibration wave motor M is rotated forwardly or reversely. An OR gate G18 produces an output $\overline{ST}$ which is H-level when the motor is driven. This output is applied to a terminal $\overline{STOP}$ of the microcomputer CPU. When the terminal $\overline{STOP}$ is L-level, the CPU does not execute the program. Thus, the program is executed at the first motor drive after the power-on.

The application of the vibration wave motor is not limited to the auto-focus circuit but it may be applied to control an iris or drive a film winder.

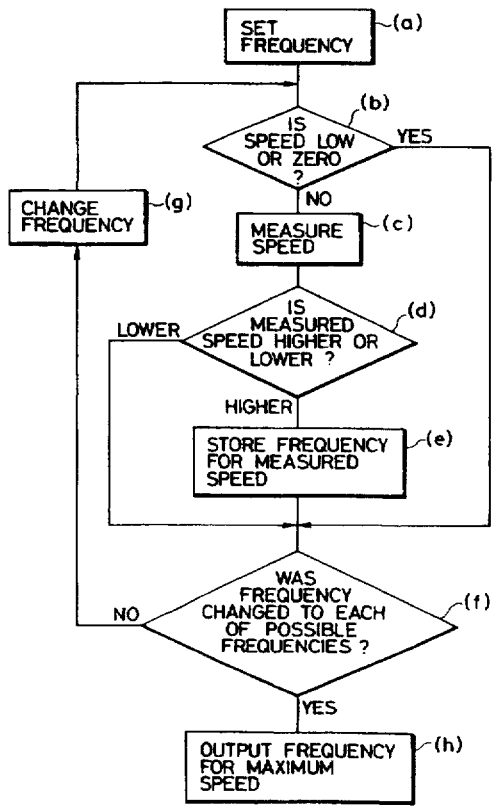

What is claimed is:

1. A vibration wave motor apparatus comprising:
    a vibration member for generating a traveling wave, said member including a first electro-mechanical energy conversion element and a second electro-mechanical energy conversion element phase-differently arranged on said member with respect to said first element;
    a member contacted to said vibration member, said member being pushed by said traveling vibration wave generated in said vibration member;

a control circuit for applying periodic voltage phase-differently to said first and second electro-mechanical energy conversion elements, a frequency of said periodic voltage being controlled by said control circuit so that said vibration member reaches a resonance state;

wherein said control circuit comprises oscillation means for applying a periodic voltage to said first and second electro-mechanical conversion elements to generate a traveling vibration wave in said vibration member, said oscillation means sequentially changing a frequency of said periodic voltage;

detection means for detecting speed of said contact member and relative speed between said vibration member and said contact member at the changing frequencies; and processing means for changing the frequency of said oscillation means, storing, in accordance with the speed detected by said detection means, a frequency which results in a maximum of one of the speeds detected by said detection means and setting the frequency of said oscillation means to the stored frequency.

2. A system according to claim 1, wherein said first and second electro-mechanical conversion elements comprises electro-strictive elements.

3. A vibration motor apparatus comprising:

a vibration member;

electro-mechanical conversion elements coupled to said vibration member;

drive circuit for applying periodic signals to said electro-mechanical conversion elements;

a control circuit for setting a frequency of the periodic signals at a predetermined relatively high level upon start of said motor apparatus, and then gradually shifting the frequency toward a lower level, whereby a speed of said motor apparatus is controlled upon the start so as to change from a low speed to a high speed.

4. An apparatus according to claim 3, wherein said control circuit effects the shifting by sequentially decreasing the frequency by a predetermined value.

5. An apparatus according to claim 4, wherein said drive circuit produces plural kinds of periodic signals which are different in their phases, and the respective kinds of signals are applied to predetermined one of said electro-mechanical conversion elements.

6. An apparatus according to claim 3, wherein said electro-mechanical conversion elements are of electrostrictive material.

7. An apparatus according to claim 3, wherein said vibration member produces traveling vibration wave by application of plural kinds of periodic signals which have different phases to the predetermined electro-mechanical conversion elements, and said apparatus produces the vibration wave as an output drive force.

8. A control apparatus for a vibration motor providing driving force by vibrating a vibration member by application of periodic signals to electro-mechanical conversion elements, comprising:

a control circuit for controlling frequency of the periodic signals; and a shifting circuit for setting, upon starting of the motor, the frequency at a predetermined first value and for sequentially decreasing the frequency, whereby a speed of said motor is controlled upon the start so as to change from a low speed to a high speed.

9. An apparatus according to claim 8, wherein said electro-mechanical conversion elements are of electrostrictive material.

10. A vibration motor apparatus for causing relative motion between an object and said vibration motor apparatus comprising:

a vibration member adapted to be in contact with the object;

electro-mechanical conversion elements coupled to said vibration member;

drive circuit for applying periodic signals to said electro-mechanical elements to produce vibration of said vibration member so as to cause relative movement between said vibration member and the object;

speed detecting means for detecting relative speed between said vibration member and the object; and processing circuit for periodically receiving outputs of said detecting means and storing datum relating to the relative speed, and for controlling a frequency of periodic signals in accordance with the stored data.

11. An apparatus according to claim 10, wherein said processing circuit controls the frequency on the basis of at least two stored data.

12. An apparatus according to claim 11, wherein said processing circuit controls the frequency on the basis of change of the stored datum.

13. An apparatus according to claim 10, wherein said detecting means includes pulse generating means for generating pulse signals corresponding to the relative speed.

14. A vibration motor apparatus comprising:

a vibration member;

electro-mechanical conversion elements coupled to said vibration member;

drive circuit for applying periodic signals to said electro-mechanical conversion elements; wherein said drive circuit produces plural kinds of periodic signals which are different in their phases, and the respective kinds of signals are applied to at least predetermined one of said electro-mechanical conversion elements; and a control circuit for setting a frequency of the periodic signals at a predetermined relatively high level upon start of said motor apparatus, and then gradually shifting the frequency toward a lower level.

15. An apparatus according to claim 14, wherein said control circuit effects the shifting by sequentially decreasing the frequency by a predetermined value.

16. An apparatus according to claim 14, wherein said vibration member produces traveling vibration wave by application of plural kinds of periodic signals which have different phases to the predetermined electro-mechanical conversion elements, and said apparatus produces the vibration wave as an output drive force.

17. An apparatus according to claim 14, wherein said electro-mechanical conversion elements are of electrostrictive material.

18. An apparatus according to claim 14, wherein said drive circuit comprises an oscillating circuit for producing the periodic signals and a setting circuit for setting a datum for determining the frequency of the periodic signals, and said control circuit changes the datum from a datum for a high frequency to a low frequency.

19. A vibration motor apparatus comprising:

a vibration member;

electro-mechanical conversion elements coupled to said vibration member;

drive circuit for applying periodic signals to said electro-mechanical conversion elements;

a control circuit for setting a frequency of the periodic signals at a predetermined relatively high level upon start of said motor apparatus, and then gradually shifting the frequency toward a lower level, wherein said drive circuit comprises an oscillating circuit for producing the periodic signals and a setting circuit for setting a datum for determining the frequency of the periodic signals, and wherein said control circuit changes the datum from a datum for a high frequency to a low frequency.

20. A vibration motor apparatus comprising:

a vibration member;

electro-mechanical conversion elements coupled to said vibration member;

a drive circuit for applying periodic signals to said electro-mechanical conversion elements;

wherein said drive circuit produces plural kinds of periodic signals which are different in their phases, and the respective kinds of signals are applied to predetermined ones of said electro-mechanical conversion elements;

detecting means for detecting the state of driving of said motor apparatus and producing an electrical signal in accordance with the state of driving;

a microcomputer for receiving the electric signal from said detecting means to control the driving state of said motor apparatus in accordance with the electrical signal.

21. A motor apparatus according to claim 20, wherein said microcomputer receives the electrical signal from said detecting means, and effects frequency control of the periodic signal in accordance with the electrical signal from said microcomputer.

22. A motor apparatus according to claim 20, wherein said detecting means includes a detecting member for detecting a speed of relative motion between said vibration member and an object imparted by vibrations caused therein by application of the periodic signal to said electro-mechanical conversion elements, said detecting elements including a portion rotatable in accordance with the relative motion and switching element for effecting switching in accordance with the rotation of the rotatable portion to produce an electric signal.

23. A motor apparatus according to claim 20 wherein said vibration member is annular and said detecting member includes an electro-mechanical conversion element, which has a width smaller than that of said vibration member, in a diametrical direction of the surface to which said electro-mechanical conversion member is contacted.

24. A control apparatus for a vibration motor providing driving force by vibrating a vibration member by application of periodic signals to electro-mechanical conversion element parts, comprising:

a control circuit for controlling frequency of the periodic signals;

a shifting circuit for setting, upon starting of the motor, the frequency at a predetermined first value and for sequentially decreasing the frequency, a signal producing circuit for producing plural kinds of periodic signals which are different in their phases, and wherein the respective kinds of signals are applied to predetermined one of said electro-mechanical conversion element parts by which a traveling vibration wave is produced in the vibration member as a driving force.

* * * * *

UNITED STATES PATENT AND TRADEMARK OFFICE
CERTIFICATE OF CORRECTION

PATENT NO. : 5,500,578
DATED : Mar. 19, 1996
INVENTOR(S) : Masaharu Kawamura

It is certified that error appears in the above-identified patent and that said Letters Patent is hereby corrected as shown below:

The title page should be deleted to appear as per attached title page.

Signed and Sealed this

Twenty-fourth Day of November, 1998

Attest:

BRUCE LEHMAN

Attesting Officer

Commissioner of Patents and Trademarks

United States Patent [19]

Kawamura

[11] Patent Number: 5,500,578
[45] Date of Patent: Mar. 19, 1996

[54] CONTROLLER FOR A VIBRATION WAVE MOTOR

[75] Inventors: Masaharu Kawamura, Kawasaki Japan

[73] Assignee: Canon Kabushiki Kaisha, Tokyo, Japan

[21] Appl. No.: 479,821

[22] Filed: Jun. 7, 1995

Related U.S. Application Data

[63] Continuation of Ser. No. 341,447, Nov. 16, 1994, abandoned, which is a continuation of Ser. No. 959,488, Oct. 9, 1992, abandoned, which is a continuation of Ser. No. 780,703, Sep. 25, 1985, abandoned, which is a continuation of Ser. No. 716,509, Mar. 25, 1985, abandoned, which is a continuation of Ser. No. 579,586, Feb. 13, 1984, abandoned.

[30] Foreign Application Priority Data

| Feb. 23, 1983 | [JP] | Japan | 58-28877 |
| Feb. 23, 1983 | [JP] | Japan | 58-28878 |
| Mar. 25, 1983 | [JP] | Japan | 58-51344 |
| Mar. 25, 1983 | [JP] | Japan | 58-51345 |
| Mar. 25, 1983 | [JP] | Japan | 58-51346 |
| Mar. 25, 1983 | [JP] | Japan | 58-51347 |

[51] Int. Cl.$^6$ .................................... H01L 41/08
[52] U.S. Cl. .................................... 318/116; 316/316
[58] Field of Search .................... 310/323, 328, 310/316, 317; 318/116

[56] References Cited

U.S. PATENT DOCUMENTS

| 3,673,474 | 6/1972 | White et al. | 318/116 |
| 3,967,143 | 6/1976 | Watanabe et al. | 318/116 X |
| 4,019,073 | 4/1977 | Vishnevsky | 310/322 |
| 4,240,141 | 12/1980 | Vasiliev et al. | 310/316 X |
| 4,249,100 | 2/1981 | Vasiliev et al. | 310/316 X |
| 4,275,362 | 6/1991 | Mishiro et al. | 310/316 |
| 4,484,099 | 11/1984 | Kawar et al. | 310/328 |
| 4,560,263 | 12/1985 | Katsuma et al. | 310/317 X |
| 4,562,374 | 12/1985 | Sashida | 310/317 |
| 4,804,760 | 3/1985 | Yamamoto et al. | 310/323 |

FOREIGN PATENT DOCUMENTS 3345274  6/1984  Germany.

Primary Examiner—Mark O. Budd
Attorney, Agent, or Firm—Morgan & Finnegan

[57] ABSTRACT

In a vibration motor for driving a movable member contacted to a vibration member by a travelling vibration wave generated by the vibration member by applying a periodic voltage to an electrostrictive element contacted to the vibration member, a frequency of the periodic voltage is sequentially changed, a drive speed of the movable member is measured at each frequency, the measurements are sequentially compared, a frequency which results in the largest measurement is stored, and the movable member is driven by the periodic voltage of the stored frequency.

24 Claims, 12 Drawing Sheets